No. 853,014. PATENTED MAY 7, 1907.
D. H. HAZLETT.
COTTON CHOPPER.
APPLICATION FILED AUG. 8, 1906.
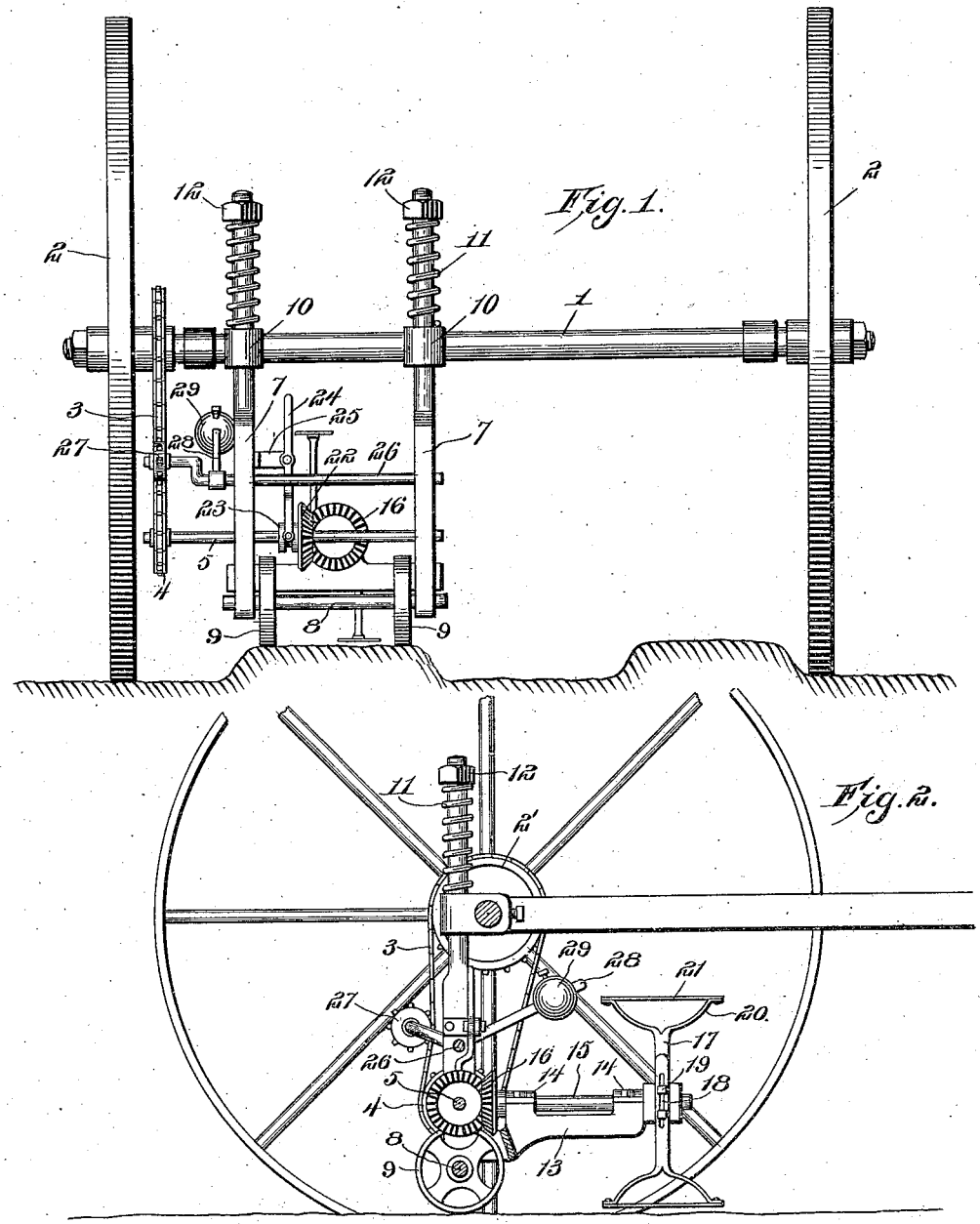

UNITED STATES PATENT OFFICE.

DAVID H. HAZLETT, OF DENDRON, VIRGINIA.

COTTON-CHOPPER.

No. 853,014.      Specification of Letters Patent.      Patented May 7, 1907.

Application filed August 8, 1906. Serial No. 329,759.

*To all whom it may concern:*

Be it known that I, DAVID H. HAZLETT, a citizen of the United States of America, residing at Dendron, in the county of Surry and State of Virginia, have invented new and useful Improvements in Cotton-Choppers, of which the following is a specification.

This invention relates to cotton choppers, and one of the principal objects of the same is to provide improved means for rotating the choppers.

Another object is to provide a yielding frame for carrying the chopping mechanism, said frame adapted to run upon the ground and to rise and fall while passing over uneven ground without interfering with the operative connection of the parts of the chopping mechanism.

Still another object of the invention is to provide improved means for automatically regulating the tension of the sprocket chain and to provide simple and convenient means for quickly throwing the chopping mechanism into and out of operation.

These and other objects are attained by means of the construction illustrated in the accompanying drawing, in which:—

Figure 1 is an end elevation of the axle and wheels of a cotton chopper embodying my invention. Fig. 2 is a vertical sectional view through the axle and looking toward the left in Fig. 1.

Referring to the drawing for a more particular description of my invention, the numeral 1 designates the axle of the machine to which the ground wheels 2 are secured. Fixed upon the axle 1 is a sprocket wheel 2' around which passes a sprocket chain 3, said chain passing around a sprocket wheel 4 secured to the end of a shaft 5 journaled in a frame 6, said frame comprising upright bars 7 in which is journaled an axle 8 provided with wheels 9. The upright bars 7 are passed through keepers 10 secured to the axle 1, and surrounding said uprights above the keepers 10 are springs 11, said springs bearing at one end against the keepers 10 and the opposite ends being held in place by nuts 12 secured to the outer ends of the bars 7. Forming part of the frame and secured to the bars 7 is a bracket 13 provided with bearings 14 for the chopper shaft 15, said shaft having a beveled gear 16 on one of its ends and choppers 17 secured to the opposite end thereof. The choppers 17 each comprise a bar provided with a slot 18 for adjustment of the choppers, and bolts 19 pass through the slots 18 upon the opposite sides of the shaft 15, as shown in Fig. 2. The choppers are provided with outwardly extending arms 20 to which are secured the chopping blades 21. On the shaft 5 is fixed a beveled gear 22 on which is formed a grooved collar 23, and a shifting lever 24 engages the groove in said collar and is pivoted to a bracket 25 secured to one of the uprights 7, said lever 24 being designed to be operated by the foot of the driver for engaging and disengaging the beveled gears to throw the choppers into and out of operation, as will be understood. A crank shaft 26 is journaled in the uprights 7, and upon the outer end of said crank shaft a sprocket wheel 27 is secured, said sprocket wheel engaging the chain 3 intermediate the sprocket wheels 2' and 4 for tightening the chain to compensate for the upward and downward movement of the frame connected to the uprights 7. A lever 28 secured to the crank shaft 26 is provided with an adjustable weight 29 for holding the sprocket wheel 27 into engagement with the sprocket chain 3.

From the foregoing it will be obvious that as the wheels 9 pass over the uneven ground the bars 7 rise and fall and yield to obstructions owing to the springs 11 surrounding said bars above the axle, the sprocket wheel 27 being always held in engagement with the chain 3 by means of the weight 29.

Having thus described the invention, what is claimed as new, is:—

1. In a cotton chopper, an axle, wheels mounted on said axle, a wheeled frame mounted on springs supported upon collars connected to said axle, a shaft passing through said frame, a sprocket wheel on said shaft, a sprocket wheel on said axle, a chain passing around said sprocket wheels, and a weighted belt tightener for tightening the sprocket chain as the wheeled frame rises in passing over uneven ground, substantially as described.

2. In a cotton chopper, an axle, wheels journaled to said axle, a frame comprising upright bars mounted to slide in keepers secured to the axle, springs surrounding said bars to yieldingly support the same, wheels secured to an axle journaled in said bars, said wheels adapted to bear upon the ground, a beveled gear on a shaft mounted in said frame, a sprocket wheel secured to said shaft, a chain passing around said sprocket wheel, a crank shaft journaled in said bars, a sprocket wheel on said crank shaft, a weight secured to said shaft for automatically tightening the chain to compensate for the yielding action of the frame, a chopper shaft, a beveled gear thereon, means for engaging and disengaging the beveled gears, and a sprocket wheel on the axle over which said chain passes, substantially as described.

In testimony whereof, I affix my signature in presence of two witnesses.

DAVID H. HAZLETT.

Witnesses:
　EDWARD ROGERS,
　W. M. WEST.